P. M. L. HERSE.
Cockle Separator.
No. 220,477. Patented Oct. 14, 1879.
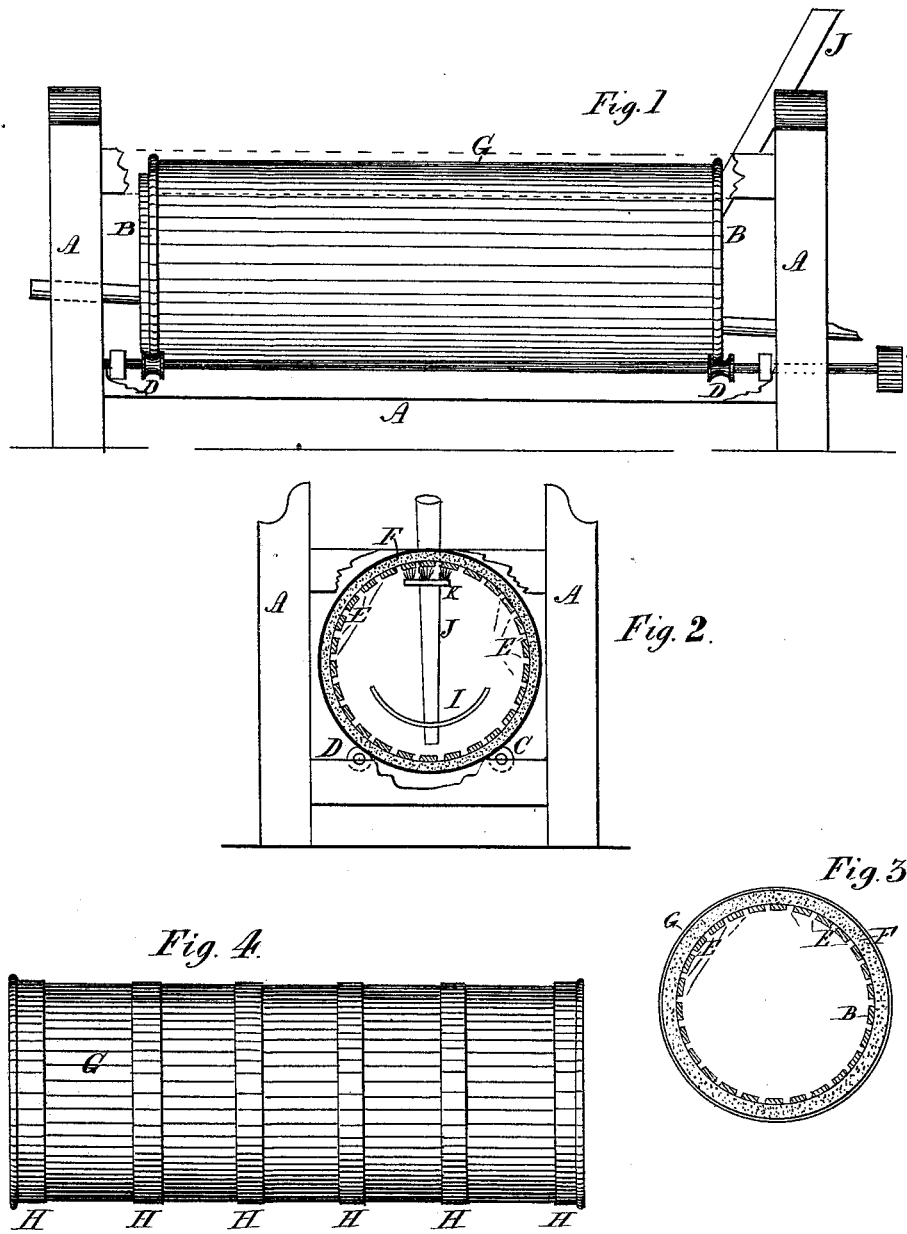

UNITED STATES PATENT OFFICE.

PAULINA M. L. HERSE, OF HAMILTON, ONTARIO, CANADA.

IMPROVEMENT IN COCKLE-SEPARATORS.

Specification forming part of Letters Patent No. 220,477, dated October 14, 1879; application filed February 12, 1879.

*To all whom it may concern:*

Be it known that I, PAULINA M. L. HERSE, of the city of Hamilton, in the county of Wentworth, in the Province of Ontario, Dominion of Canada, have invented certain new and useful Improvements in Cockle-Separators; and I do hereby declare that the following is a full, clear, and exact description of the construction and operation of the same, reference being had to the drawings accompanying this specification.

Figure 1 is a side elevation; Fig. 2, an end elevation; Fig. 3, a transverse section of the cylinder; Fig. 4, a side view of cylinder, showing bands around it.

Heretofore the difficulty in cleaning grain has been to make a thorough separation of impurities, especially cockle, from the grain, and my improvement is designed to overcome the difficulty.

Grain-separators have been used in which was employed a revolving cylinder, being composed of a perforated sheet of metal, said cylinder having a jacket surrounding it, of oil-cloth generally, or metallic plates, and in some instances leather was used.

The principal objection to the employment of this form of cylinder and jacket was, the cylinder and jacket could not be made close enough to keep out the dust and grain from going between them—a very serious objection, by all means to be avoided.

I construct my cylinder as follows: I first take a metal plate of the required degree of thickness; then, by means of a punching-machine, perforate it with small holes of the proper size; then form the plate cylindrically. I then coat the entire outside surface with cement in a plastic state, which will soon set and harden, interposing any thin material between the cylinder and cement to keep the cement from entering the perforations in said cylinder. Preferably I glue sheets of paper on the cylinder before laying on the cement. Any kind of cement or artificial stone will answer that has the property of being made soft and afterward to set and harden. I prefer to use plaster-of-paris as the best and most economical substance possessing the above qualities, as it answers the purpose most admirably; but all its products and all the products of cement and kindred substances may be used to attain the same end.

The outer surface of the cylinder and cement jacket are so closely connected that no space will remain between them for dust or grain to become lodged therein.

For the protection of the said cement jacket I place around it a covering of thin sheet metal or a series of metallic hoops, as the case may be. As the revolution of the cylinder and shaking of the machine might have a tendency to crack the coating, the protecting-covering in either method would prevent it.

By reference to the drawings it will be seen that Fig. 1 is a side elevation of the machine; A, the frame; B, the perforated metallic cylinder, resting upon the two friction-rollers C C, or gear-wheels, and two guide-rollers, D D, at each end on their respective shafts.

This construction does away with a central shaft, and allows more room for the parts of the machine inside of the cylinder, such as the trough, catch-board, and conveyer. The old form of cylinder, having a central shaft, required arms at both ends, which were much in the way of other portions of the machine. Thus the latter difficulty is avoided.

E, Fig. 2, represents the perforations in the metallic cylinder. F is the coating of cementing substance, as above described. G is the outer protecting-sheet, and H, Fig. 4, the hoops or bands used instead of an entire outside sheet-metal covering. I is the catch-board; J, the receiving-spout.

The drawings show only one cylinder; but more may be, and are oftentimes, used; and if more than one is used I construct the cylinders and jackets the same as hereinbefore described.

K is a brush, which may be secured inside of the cylinder in any convenient manner, to brush out any kernels of grain that may stick in the perforations.

Having thus described my device and its advantages, what I claim as my invention, and desire to secure by Letters Patent, is—

1. In combination with a perforated revolving cylinder, B, of a cockle-separator, a jacket, F, made to fit tight to the same, said jacket being formed of any substance that can be placed around the cylinder in a soft state, and which will have the property of setting quickly and harden in a short time, so as to consolidate the two together, substantially as and for the purpose specified.

2. In combination with the revolving cylinder and coating of a grain-separator, an inclosing band or bands, as and for the purpose specified.

P. M. L. HERSE.

In presence of—
  A. H. KINGDON,
  W. BRUCE.